(12) United States Patent
Itkonen (10) Patent No.: US 8,558,410 B2
(45) Date of Patent: Oct. 15, 2013

(54) ENERGY TRANSFER ARRANGEMENT AND METHOD

(75) Inventor: Maija Itkonen, Helsinki (FI)

(73) Assignee: Powerkiss Oy, Espoo (FI)

( * ) Notice: Subject to any disclaimer, the term of this patent is extended or adjusted under 35 U.S.C. 154(b) by 488 days.

(21) Appl. No.: 12/678,083

(22) PCT Filed: Sep. 17, 2008

(86) PCT No.: PCT/FI2008/050515
§ 371 (c)(1),
(2), (4) Date: Jul. 20, 2010

(87) PCT Pub. No.: WO2009/037380
PCT Pub. Date: Mar. 26, 2009

(65) Prior Publication Data
US 2010/0308665 A1    Dec. 9, 2010

(30) Foreign Application Priority Data

Sep. 18, 2007  (FI) ................................. 20075654 U (51) Int. Cl.
*H01F 27/42* (2006.01)
(52) U.S. Cl.
USPC ........................................................ 307/104
(58) Field of Classification Search
USPC ........................................................ 307/104
See application file for complete search history.

(56) References Cited

U.S. PATENT DOCUMENTS

| 5,519,262 A | 5/1996 | Wood |
| 7,952,322 B2 * | 5/2011 | Partovi et al. ................. 320/108 |
| 2003/0075670 A1 | 4/2003 | Tuominen |
| 2004/0150934 A1 | 8/2004 | Baarman |
| 2004/0232845 A1 | 11/2004 | Baarman et al. |
| 2005/0116683 A1 | 6/2005 | Cheng et al. |
| 2006/0202665 A1 | 9/2006 | Hsu |
| 2006/0205381 A1 | 9/2006 | Beart et al. |
| 2007/0182367 A1 | 8/2007 | Afshin et al. |
| 2009/0072782 A1 * | 3/2009 | Randall ......................... 320/107 |
| 2009/0284245 A1 * | 11/2009 | Kirby et al. ................... 323/318 |
| 2012/0153893 A1 * | 6/2012 | Schatz et al. ................. 320/108 |

FOREIGN PATENT DOCUMENTS

| GB | 2 399 466 A | 9/2004 |
| WO | WO 03/105308 A1 | 12/2003 |
| WO | WO 03/105311 A1 | 12/2003 |
| WO | WO 2004/038888 A2 | 5/2004 |
| WO | WO 2004/073176 A2 | 8/2004 |
| WO | WO 2005/122686 A2 | 12/2005 |

OTHER PUBLICATIONS

Collins, "Cutting the cord," Engineering & Technology, 2007, pp. 30-33.
Hatanaka et al., "Power Transmission of a Desk With a Cord-Free Power Supply," IEEE Transactions on Magnetics, 2002, vol. 38, No. 5, pp. 3329-3331.
Gao, "Traveling Magnetic Field for Homogeneous Wireless Power Transmission," IEEE Transactions on Power Delivery, 2007, vol. 22, No. 1, pp. 507-514.

(Continued)

*Primary Examiner* — Robert L. Deberadinis (57) ABSTRACT

A energy transfer arrangement including a first energy surface, a second energy surface, first means for transferring energy from the first energy surface to the second energy surface, and second means for transferring energy from the second energy surface to a terminal device.

19 Claims, 8 Drawing Sheets

(56) References Cited

OTHER PUBLICATIONS

Rodenbeck et al., "A Phased-Array Architecture for Retrodirective Microwave Power Transmission from the Space Solar Power Satellite," IEEE MTT-S Digest, 2004, pp. 1679-1682.
Finnish Search Report issued in Finish Patent Application No. 20075654 on Apr. 22, 2008 (with English-language translation).
Written Opinion of the International Searching Authority issued in International Application No. PCT/FI2008/050515 on Jan. 2, 2009.
International Search Report issued in International Application No. PCT/FI2008/050515 on Jan. 2, 2009.
Supplementary European Search Report, issued Jan. 16, 2013 in European Patent Application No. EP 08805438.

* cited by examiner

ENERGY TRANSFER ARRANGEMENT AND METHOD

BACKGROUND OF THE INVENTION

The invention relates to an energy transfer arrangement and an energy transfer method, and particularly to a simplified energy transfer arrangement.

PRIOR ART

According to the prior art, the storage of electric current of battery-operated electrical devices has been controlled manually. A user noticing a drop in current searches for a charging unit consisting of a transformer, an electric conductor and a contact plug. Next, the user searches for a suitable wall socket and connects the device to the mains, whereby the charging of the device begins. When the need for charging or the possibility for it no longer exists, the user detaches the device from the mains.

Conventional use of charging units and wall sockets often involves a number of disturbing and inconvenient factors: wall sockets are not always nearby in an optimal manner; the charging equipment may be misplaced, the charging equipment at hand only recharges specific products, the user may forget either the charging or the charging unit at a critical moment, the charging equipment may be inconvenient to carry along, a charge level that is too low is harmful for certain battery types, the inconvenience of the charging event prevents constant charging of a short duration of the battery, whereby the battery may run down too soon, at the user's annoyance, and working with the equipment connected to the mains may significantly impair the comfort of use of the battery-operated equipment.

Wireless power supply methods have also been disclosed. Publication US 2005/0116683 A1 describes a system and method for transferring power without electrically conductive contacts, charging being in this case carried out not by conventional charging units based on contact but on the basis of contact-free electromagnetic induction. However, this equipment, as well as others based on induction charging, nevertheless consists of accessories, charging units or charging stations containing independent units and separate plateline sensors possibly connected to other products. The wires of these devices still remain within the user's reach, and devices are considered as electronic accessories and as devices specifically meant for charging. Hence the only problem they solve with regard to the charging event is that a contact between the electrical device and the charging unit is disposed of, but problems related to the charging event and manual power control, for example, remain unsolved.

In other words, current prior art wireless charging systems are not wireless in reality, because there are still wires within the user's reach. Most commonly wireless charging takes place by means of a charging plate, which is connected to the mains by an electric conductor, the charging event thus being tightly place-related. Hence the transmitter element, identification element or both that enable wireless charging in prior art solutions are still connected to the mains by a wire and therefore they do not support comprehensive wireless power transmission.

BRIEF DISCLOSURE OF THE INVENTION

It is an object of the invention to provide a method and equipment implementing the method in such a way that the above problems are solved. The object of the invention is achieved by a method and system characterized by what is stated in the independent claims. The preferred embodiments of the invention are disclosed in the dependent claims.

The invention is based a wireless energy transfer arrangement that may be implemented by various techniques. For example, energy may be transferred by means of radio or microwaves, laser beam or electromagnetic induction. Irrespective of the technique applied the invention contains a first power surface; means for transferring power to a second power surface; and a second power surface comprising one or more energy transfer units by means of which charging current may be supplied to one or more terminal devices.

According to the invention, the surfaces may also be used for another purpose. Hence floorings, for example, which are primarily used for walking on them, may be used for charging a piece of furniture. A piece of furniture, which primarily serves as an item of interior decoration, may be automatically used also for charging a terminal device.

An advantage of the method and system of the invention is that the user is totally freed of the charging unit and the wall socket. The user no longer needs to control the charging or actively carry it out either, because while s/he is engaged in his/her normal daily routines, the availability for use of the devices is maintained and ensured automatically. Moreover, the invention renders charging units redundant.

BRIEF DISCLOSURE OF THE DRAWINGS

In the following the invention will be described in greater detail with reference to preferred embodiments and the accompanying drawings, in which.

DETAILED DISCLOSURE OF THE INVENTION

In the following, an arrangement for a completely wireless, e.g. two-phase, energy transfer will be described. The presented characteristics will be described only to the extent they are relevant for the disclosure and implementation of the invention and the preferred embodiments thereof.

The invention and its embodiments are not restricted to a particular method of use, user, terminal device, number of energy transfer surfaces, shape, size, weight, outer appearance, structure, attachment mechanism, arrangement, integration, distance or reciprocal location etc., furnishing element, energy transfer surface, method of user or equipment identification, energy transfer method, power transfer method or charging method.

Consequently, the terminal device may be a device, such as a mobile station, communicator, navigator, toy, household apparatus, handicraft tool, computer, camera, musical device, hygiene device, therapeutic device, lighting fixture, lamp or toothbrush, that requires and/or stores e.g. electric energy, electric power, and the user may be e.g. a person or another device. The first energy transfer surface may be a floor, carpet, laminate, wall, wallpaper, ceiling, suspended element, growing element. The shape, size, weight, outer appearance, structure, attachment, arrangement, integration etc. of the surface or the surface and the structure supporting it may vary. Part of the surface may be underneath or within another surface.

The second energy transfer surface may be completely or partly identical with the first energy transfer surface. In addition, the second energy transfer may be a piece of furniture, furnishing element, structural element or auxiliary element. At least part of the first and/or second energy transfer surface may be reduced or enlarged by placing the surface within the other or another surface or by retrieving it therefrom, or by building a larger surface from smaller surface parts.

The second energy transfer surface is movable on the first energy surface, or the first energy surface is movable on the second energy surface. According to a preferred embodiment, the second energy surface is freely movable on the first energy surface and/or the first energy surface is freely movable on the second energy surface. In addition, the terminal device is freely movable on the first and/or second energy surface. According to a preferred embodiment, the first and the second energy surfaces are not in direct contact with one another. One or more of the surfaces or parts thereof may be wireless or wired. According to a second preferred embodiment, the first or the second energy surface or a part thereof is substantially planar or banded.

The identification of the one or more energy transfer surfaces, users or devices may take place on the basis of the frequency, amplitude or phase of the signal of identification or use. Alternatively, the one or more energy transfer surfaces or users do not need to be identified, but charging may be continuous and automated, or may take place at specific intervals. Energy transfer may be carried out by means of radio or micro waves, laser beam or electromagnetic induction, for example.

In inductive energy transfer, energy is transferred by a magnetic field in such a way that a high-frequency current supplied to a charging coil generates a changing magnetic field, which induces alternating current in the receiver coil used for charging the batteries. The invention may use resonant coupling to enable a longer charging distance.

The identification may take place by means of an RFID (Radio Frequency Identification) device, for example, or by some other method of remote reading and/or remote storage. The identification device on the first surface may be a receiver, transmitter or transceiver for identifying and/or observing the second surface, second means, the support structure and/or terminal device of the second surface, and the identification device on the second surface may be a receiver, transmitter or transceiver for identifying and/or observing the first surface, first means, the support structure and/or terminal device of the first surface. Both surfaces, the support structures and the terminal devices or elements in communication therewith may be provided with a plural number of wireless or wired identification or observation devices.

The application describes an energy transfer arrangement and an energy transfer surface, but it is to be understood that it may also be used on and applied to a power transfer arrangement and a power transfer surface, for example.

According to a preferred embodiment of the invention, the first surface and/or the second surface identify, observe the second surface, and the second surface and/or the second means identify, observe the terminal device or a part thereof. The identification means, energy transfer means, support structures, energy storage means, communication means, etc. may be placed either on the surfaces or on the first and/or second means or in communication therewith. They may be fixed, integrated or detachable etc.

Figure 1:
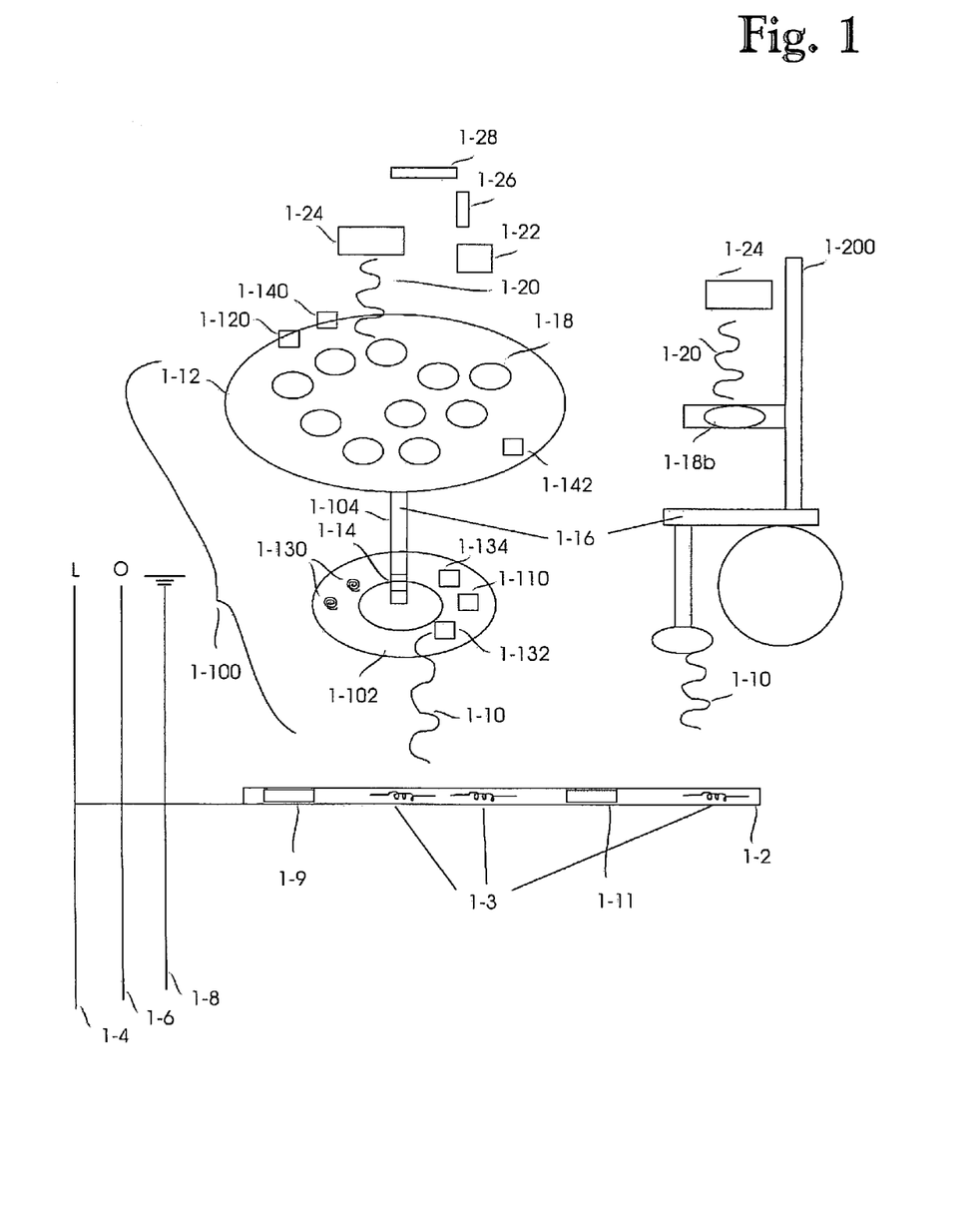
FIG. 1 is a block diagram of the invention and preferred embodiments thereof.

FIG. 1 is a block diagram of the invention and the preferred embodiments thereof. Here the invention is implemented using inductive power transfer. The figure comprises a charging surface 1-2, such as a floor, onto which a charging surface, such as a table top, 1-12 may be placed. The floor comprises a charging arrangement consisting of a plural number of power-transmitting primary coils 1-3, power source 1-4 . . . 1-8 and the necessary control electronics 1-9. In addition, the system may contain a communication system 1-11 in uni- or bi-directional communication 1-10, 1-13 with a charging furnishing element 1-100. The communication system may include one or more transmitters or transceivers. A plural number of different or similar charging furnishing elements 1-100, such as tables, surfaces and shelves, may be placed on the first power surface, such as a floor, when the power sources are dimensioned for the required load.

The charging furnishing element 1-100 comprises a current-receiving part 1-102, current-relaying part 1-104 and current-delivering part 1-12. In addition, it may comprise a current-storing part 1-14, 1-110 that allows the charging current from the floor to be leveled, and a communication part 1-120 for communication between the floor to be charged and/or the device to be recharged for communication 1-20.

The current-receiving part 1-102 comprises one or more current-receiving secondary coils 1-130, rectifier 1-132 and filter capacitor 1-134. The current-storing part may be electrically connected, for example, to the current-storing part. The current-storing part 1-110 may comprise one or more batteries and/or a capacitor, for example. Some of them are electrically connected, for example, both to the current-receiving and current-transmitting part, which balances the current flow between them.

The current-delivering part 1-12 comprises one or more charging coils 1-18, a power source 1-140 connected to the current-storing part and the necessary control electronics 1-142. In the example of the figure the parts are placed in different parts of the table, but depending on the nature and purpose of use of the furnishing element, reciprocal location of the parts varies.

FIG. 1 also shows a terminal device 1-24 and elements to be arranged to the device or in connection with it, such as a battery 1-28, adapter 1-26 and covers 1-22. Yet another example is a wheelchair 1-200 provided with a second charging surface 1-18*b* for charging 1-20 the terminal device 1-24.

Figure 2:
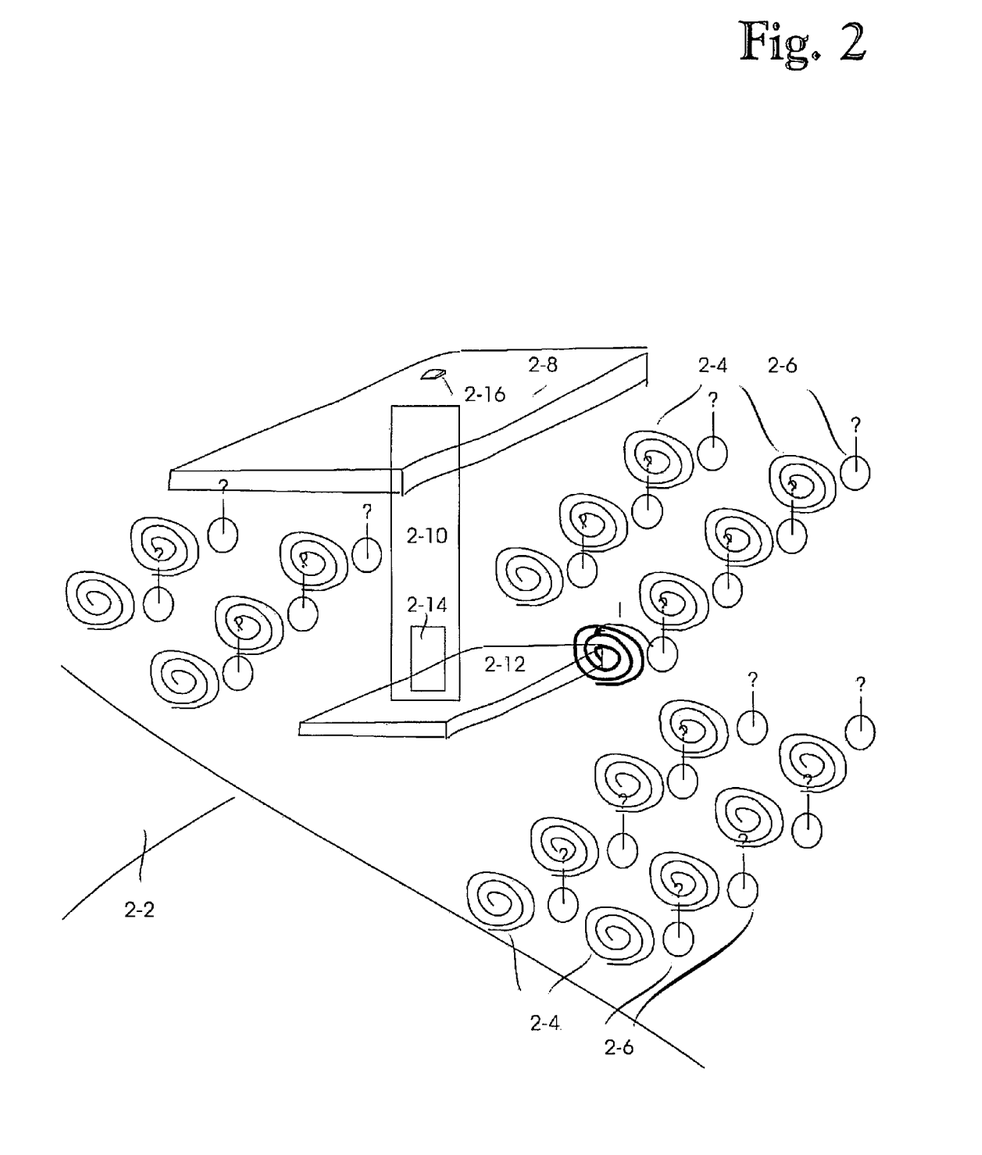
FIG. 2 shows a first surface of the invention and preferred embodiments thereof.

FIG. 2 shows a first charging surface of the invention and the preferred embodiments thereof. The first surface 2-2 may be a coating, floor or floor covering, for example. Onto the surface, on top or underneath it, there may be provided one or more power transfer elements 2-4 and one or more identification elements 2-6. The power transfer element may be a primary coil, an induction loop, for example, and the identification element may be e.g. a radio frequency device for remote identification, such as RFID (Radio Frequency Identification) or some other method of reading and/or storing data from a distance. The charging unit may also be identified automatically, for example by supplying current to the charging coil at short intervals, whereby on the basis of changes in resistance and/or current, for example, it may be possible to detect whether there are devices needing current in the vicinity. The power transfer elements and/or the identification elements may be interconnected to form a mat, such as an RFID mat, induction mat or RFID induction mat, for example and the mat may then be connected, directly or indirectly, to a power source, such as the mains current. The identification elements may function automatically, intelligently, at certain intervals, or they may be bypassed.

FIG. 2 further shows a table 2-8 onto which a device 2-16 to be recharged may be placed. A table support 2-12 may be placed onto the first surface and, if necessary, a charging battery 2-14 may be provided on a table leg 2-10 or in connection with the leg.

When the first surface 2-6 is sensing the second surface or the support structure of the second surface, a first transceiver, for example a first RFID transmitter or RFID transceiver, sends an inquiry at predetermined intervals, for example, on whether within the region of the induction loop of the first surface there are second surfaces or for example furnishing elements, such as a table, belonging to the surface or in connection therewith and in need of charging current. A second transceiver, such as a second RFID, integrated into the furnishing element or brought into connection therewith responds to the inquiry. The inquiry may be answered for example when the battery charge of the furnishing element is low or the charge has dropped below a certain threshold value.

After having received information on the need for current of the first surface, such as a floor, the RFID transmitter communicates to the induction loop in the floor accordingly and then a suitable current may be connected to the loop for charging the second surface or an energy-storing element brought into connection therewith or for transferring energy thereto. Moreover, the furnishing element may be provided with an indicator, such as light, sound, colour or form, indicating to the user that power transfer or charging has started or that the surface may be used for charging. When the battery of the furnishing element is full, it informs that the charging may be terminated, whereby current is switched off from the charging loop on the floor. This may be carried out for example by actively informing that the battery is full or by discontinuing the indication of the charging need, or passively by terminating reception of current, which the charging part detects automatically and terminates the power transfer.

It is to be noted that the furnishing element may be moved in a normal manner from one place to another and yet be still used for charging a wireless terminal device. The user sees the charging floor as any ordinary floor, and the furnishing element as any movable, detachable or fixed element that forms the second surface or a part of it and may be used for charging the terminal device. It is also to be noted that the furnishing element does not require a mains lead.

If there is a plural number of charging furnishing elements in need of current in the space concerned, a charge battery provided in the furnishing element may be used for balancing the need for charging current and to ensure that the charging floor does not become overloaded and, at the same time, to make sure that the furnishing element is always capable of charging the terminal device. The electronics connected to the charge batteries may render them intelligent, whereby it is possible to know how much, when and what will be charged. Further, the charge batteries may monitor the load of the charging mat and charge themselves, when the load is low.

For example, when a cafeteria is closed, the batteries of its charging furnishing elements, such as tables, chairs, counter tops or charging slots may recharge themselves to the full extent.

Figure 3:
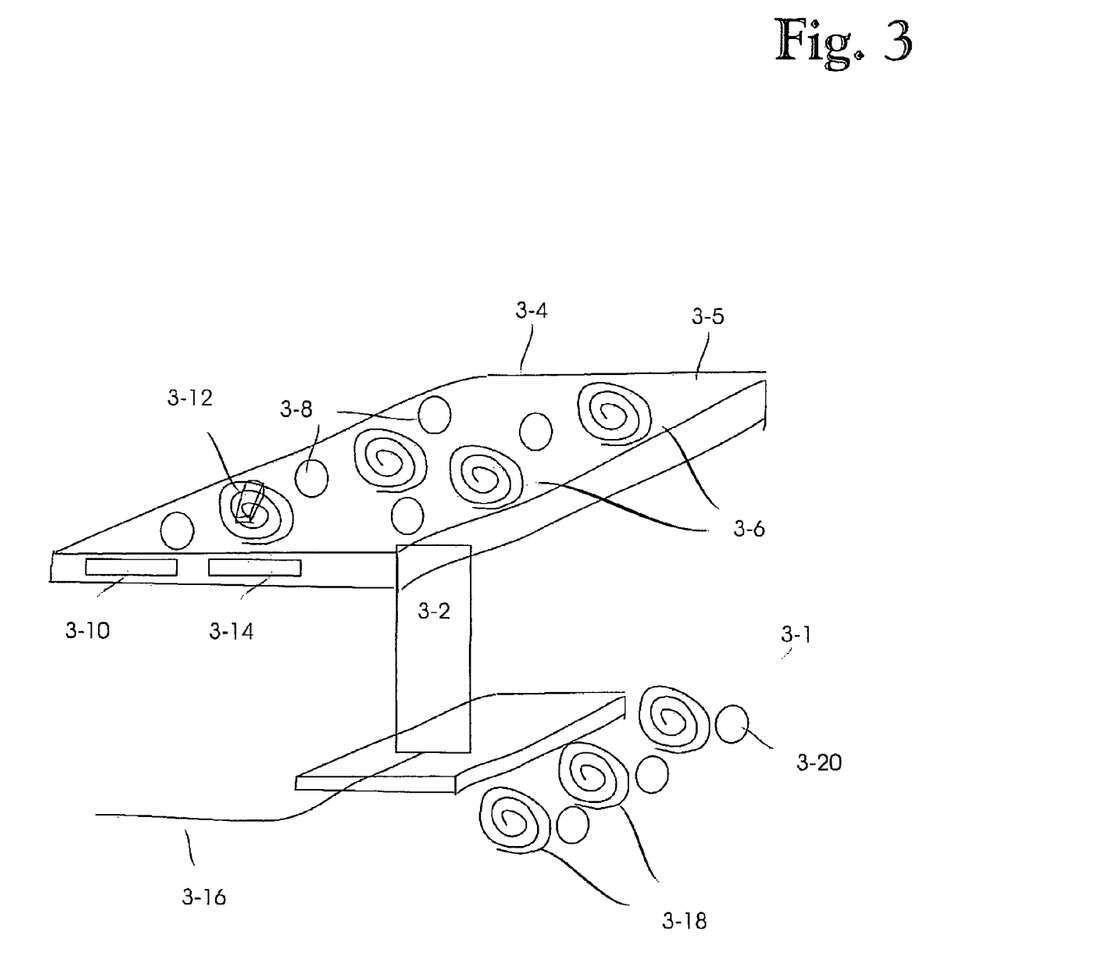
FIG. 3 shows a second surface of the invention and preferred embodiments thereof.

FIG. 3 shows a second surface of the invention and the preferred embodiments thereof. Here the surface, such as the surface of a furnishing element or a furnishing element, such as a table, shelf, surface or other planar furnishing element 3-4, the upper face of 3-5 which is provided with charging coils 3-6, represents a surface compatible with a wireless charging system. Third transceivers, such as RFID transceivers 3-8, may be used for communicating with electrical devices, the transmitter guiding the control electronics 3-10 to supply charging current to coils in the vicinity of the electrical device 3-12. A fourth transceiver, such as the RFID transceiver, in the terminal device 3-12 or in connection therewith may communicate with the second power transfer surface on the charging need of the terminal device. The charging current may be produced by one or more chopper power sources 3-14, for example. The furnishing element may be connected directly either to ordinary mains current 3-16 by a standard electric plug or also to a wireless system 3-18, 3-20 via a floor 3-1, wall or ceiling, for example. The first and the second power surface may be interconnected by means 3-2 for transferring power from one surface to another.

Figure 4:
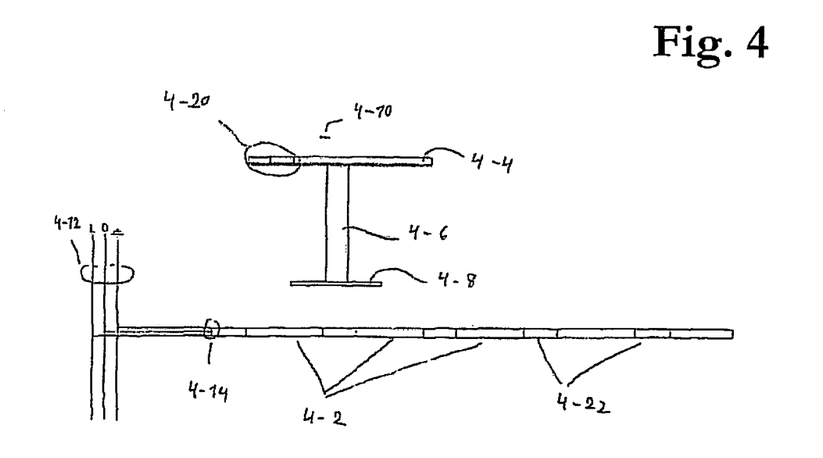
FIG. 4 shows an intelligent constructional component of the invention and preferred embodiments thereof.

FIG. 4 shows an intelligent constructional component of the invention and the preferred embodiments thereof. The intelligent construction component, such as an intelligent charging constructional component, may be a mat-like element which is easy to work on and which has fixed or detachable parts, such as induction loops and RFID transmitters, enabling charging, such as intelligent inductive charging. The component provides the power transfer arrangement with a uniform transmitter, which is required in wireless charging.

The intelligent constructional component 4-2 for charging the terminal device 4-10 may be connected to a room, space, chamber or furnishing solution in the planning or building phase, thus allowing for example pieces or parts of furniture 4-4, 4-6, 4-8, floor coverings, wall coverings and ceiling coverings to be taken into account. In addition, on top of the component it is possible to place a desired additional cover, such as a table top 4-4, wallpaper, carpet or floor covering. The thickness of the power surface may be e.g. 0.1-100 mm, for example 0.4 mm, 1 mm, 10 mm, 18 mm, 33 mm, 45 mm, 56 mm, 67 mm, 70 mm, 83 mm or 93 mm. The intelligent constructional component may be placed between two surfaces of the furnishing product in a "hamburger" form. In the processing phase, the component may be cut into parts of different sizes and shapes, and the entire component may consist of one or more parts 4-2 comprising transfer or identification means and active and passive elements, such as support, transfer or identification means, between 4-22 them. It is also possible to arrange identification, storage and communication means, for example, to the surfaces or in connection therewith, for example to a table, as in the figure. The component may be connected to an external power supply 4-12 in a wired manner by conductors 4-14, or also wirelessly. The power supply may be obtained from mains current, power provided by a vehicle, battery, fuel cell, solar panel or energy produced by a man or an animal.

Figure 5:
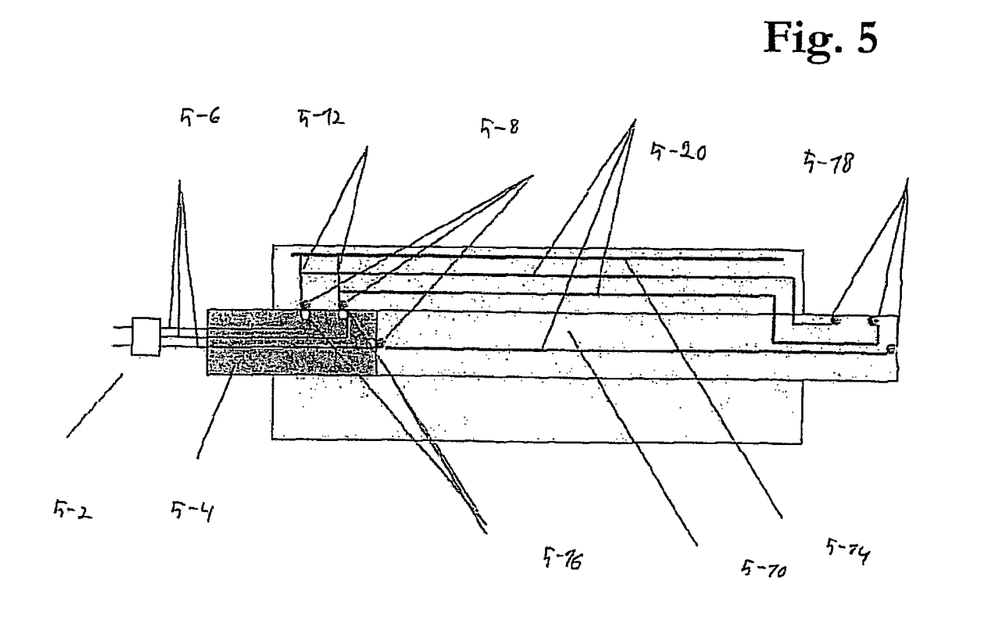
FIG. 5 shows an intelligent constructional surface material of the invention and preferred embodiments thereof.

FIG. 5 shows an intelligent constructional surface material of the invention and the preferred embodiments thereof. The surface material may comprise a body 5-10, for example, formed by e.g. a mat-like constructional material, such as a plastic membrane, net, skin, laminate or composite. One or more transmitters 5-14 and charging coils fed by current with conductors 5-12 may be arranged to the mat or integrated therein. The current is led to the conductors 5-12 by a relay 5-4, which is connected to the power supply by means of a plug 5-2 or conductors 5-6, for example. The relay 5-4 has contactors 5-16, which come into contact with contactors 5-8 provided in the component structure 5-10, the latter transferring the charging current to the transmitter 5-14 or to a next part of the material. From conductors 5-12 the energy may be transferred further via conductors 5-20 to contactors 5-18, which allow energy to be transferred further to the next intelligent constructional surface material element, which may be a single tile, wallpaper, skin or a piece of parquet.

The constructional surface material may form a uniform transmitter or transceiver as required in wireless charging and may comprise a plural number of different parts. When the parts are interconnected, electric energy may be transferred over the contact surfaces, for example, from one part to another. The combined charging functionality does not restrict other use of the element, such as the cutting thereof into smaller parts. When inductive charging is used, copper wire, for example, may be used and it may form a fixed part of the constructional surface material.

Figure 6:
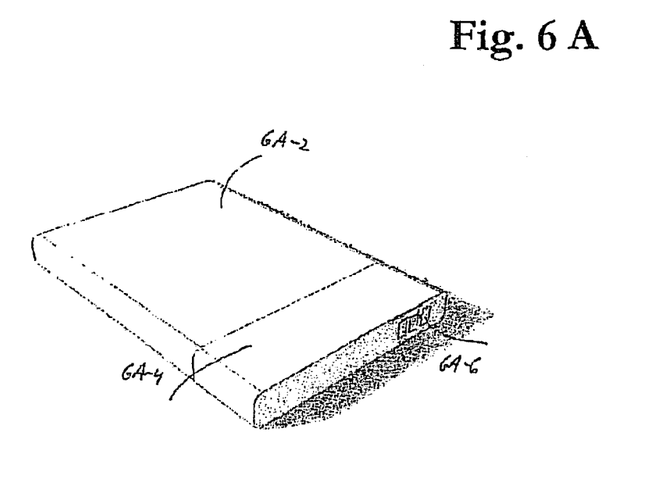
FIG. 6a shows a battery of the invention and preferred embodiments thereof.
FIG. 6b shows an electric circuit of the invention and preferred embodiments thereof.

FIG. 6a shows a battery of the invention and the preferred embodiments thereof. The battery, which is compatible with the wireless charging system and installed to the terminal device or in connection therewith, has physical dimensions and electrical properties that make it compatible with the original battery of the electrical device. The battery is divided into an electricity-storing part 6A-2 and into a receiver part 6A-4 compatible with the wireless charging system. The parts may be freely arranged, and the storage part and/or the receiver part are provided with an electrical coupling 6A-6 to the actual electrical device. If the electrical coupling is physically or electrically compatible with a standard battery suitable for the terminal device, no changes need to be made to the terminal device.

FIG. 6b shows an electric circuit of the invention and the preferred embodiments thereof. The internal structure of the electricity-storing part 6A-2 of FIG. 6a may correspond to an ordinary battery, for example, or to some other means of storing electrical energy. The internal structure of a receiver part 6A-4 depends on the wireless charging system employed. In the inductive charging system structure of FIG. 6B, the receiver unit 6B-4 may consist of a secondary coil 6B-2, the alternating voltage produced by which is filtered to direct voltage in the rectifier 6B-4. The rectifier may further comprise one or more commonly known uni- or bi-directional full-wave or half-wave rectifiers, in which intermediate take-off may be used. In addition, the device may be provided with one or more filter capacitors 6B-6 or some other filter parts, and a connection 6B-8 to the electricity-storing part and to the electrical circuit 6B-10 of the actual electrical device.

If the electrical coupling to the electrical device is arranged through the electricity-storing part, the receiver part only comprises a coupling to the electricity-storing part. In addition, the device may contain a communication part 6B-10, which transmits information on the charge status of the battery and on the desired charging power, for example, and other possible data to the current-supplying charging part of the electric charging system.

Figure 7:
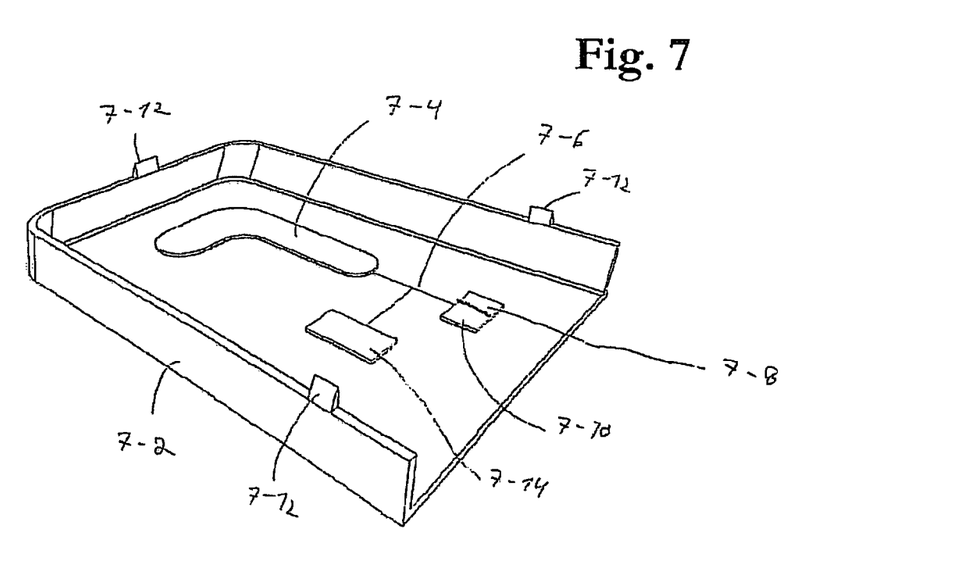
FIG. 7 shows a cover structure of the invention and preferred embodiments thereof.

FIG. 7 shows a cover structure of the invention or the preferred embodiments thereof for exchangeable covers of a portable electrical device, such as a mobile phone or a musical player. A cover 7-2 that is compatible with a wireless charging system has physical dimensions and connectors 7-12 that are compatible with a prior art cover of the electrical device, and hence it is directly exchangeable with a standard cover without other changes being required in the terminal device.

Inside the cover 7-2 there is a receiver 7-4, which is compatible with the wireless charging system and connected to the electric system of the device. In the case of an inductive wireless charging system, for example, the receiver part may contain a secondary coil, rectifier and filter capacitor. The cover may contain separate control electronics 7-8, whereby the receiver and the control electronics unit may be electrically combined 7-6. In that case the electrical coupling to the electrical device 7-10 takes place via the electronics unit. The embodiment may further contain a communication part 7-14, which may send information for example on the charge level of the battery, the desired charging power and other data to the communication part of the electric charging system and the current-supplying charging part. The communication may be uni- or bidirectional. The cover may be of a special construction. The cover part is preferably compatible with the original cover part or a portion thereof as to its physical dimensions, attaching mechanism and/or electrical properties, for example. The material may be plastic, metal, wood, composite or a combination of these, for example.

Figure 8:
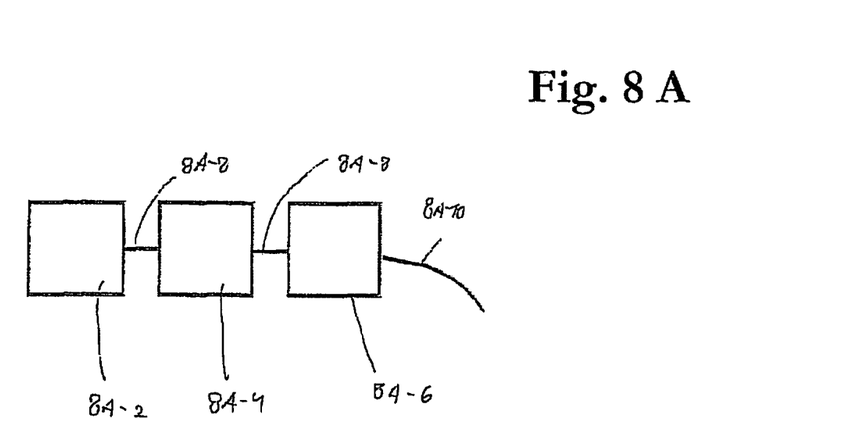
FIG. 8a shows an electric circuit of the invention and preferred embodiments thereof.
FIG. 8b shows a first adapter of the invention and preferred embodiments thereof.
FIG. 8c shows a second adapter of the invention and preferred embodiments thereof.
FIG. 8d shows a third adapter of the invention and preferred embodiments thereof.

FIG. 8a shows an electric circuit of the invention and the preferred embodiments thereof. It comprises a receiver 8A-2 compatible with a wireless charging system, an electronics part 8A-4 and communication part 8A-6 communicating with a fixed charging unit. One or more parts may be separate components or blocks, or physically of the same block. If the functional parts are located apart from one another, there is an electric connection 8A-8 between them. The arrangement and device of the invention or the preferred embodiments thereof communicate with the electrical device 8A-10, and the connection may be set up from any one of the above-mentioned functional parts.

FIGS. 8b, 8c and 8d show a first, second and third adapter of the invention and the preferred embodiments thereof. An adapter compatible with the wireless charging system may be small, and the adapter or a part thereof may have a shape conforming to that of the electrical device, or a standard shape. The adapter may be connected to the electrical circuit of the electrical device through e.g. a charging plug, a USB (Universal Serial Bus) connector, FireWire connector (IEEE 1394), directly to the circuit board, or by some other means. In FIG. 8b the adapter 8B-2 or a part thereof is flat and possibly self-adhesive, and it may be attached to the charging plug 8B-6 of the electrical device 8B-4 or to the charging plug 8B-6 of its battery, for example. In FIG. 8c the adapter 8C-2 or a part thereof has a standard rectangular, round or planar shape and it may be connected to the charging plug 8C-6 of the electrical device 8C-4 or to the charging plug 8C-6 of its battery, for example. In FIG. 8d the adapter 8D-2 or a part thereof has a substantially planar and/or longitudinal shape and may be connected, together with the electrical device, to a charging plug 8D-6 by one or more counter pieces 8D-8. In addition, the adapter may be placed within the terminal device and connected to an interface between the terminal device and the battery, for example, or to some electrically suitable connection, interface or port.

As described above, the invention and its preferred embodiments aim at totally removing or partly reducing the inconvenience related to the charging of a terminal device and to the use of chargers. From the user's point of view the invention and its preferred embodiments provide a renewed charging event and method for the user to take care of the operational availability of his/her device. The invention and the preferred embodiments thereof combine a number of new and existing technical solutions in a different operational environment and in a new situation of use. A charging paradigm of the invention and the preferred embodiments thereof is a situation of use, in which the user no longer actively takes care of the availability for use of his/her device, but leaves that to the environment.

The solution of the invention and the preferred embodiments thereof frees the user totally from the charging unit and the plug. Moreover, the user no longer needs to think about charging, because while s/he goes on with his/her everyday life, for example works at his/her desk, has a coffee-break, uses his/her bedside table etc., the operational availability of the devices is maintained and ensured automatically. Hence the invention and the preferred embodiments thereof render separate chargers redundant.

According to a preferred embodiment, the arrangement comprises two power surfaces and a terminal device adapted to the arrangement. From the user's point of view the outer appearance of the power surfaces and the ways in which they are used resemble ordinary furnishing elements, such as floor coverings, wall coverings and ordinary fixtures.

According to yet another preferred embodiment, wireless energy transfer or a part thereof may be additionally provided with wired energy transfer or with another type of energy transfer for enhancing, speeding up or ensuring the energy transfer.

The power source transfers electric energy to a first power surface. The first power surface may comprise an identification element or elements for detecting a second power surface on the power surface or in the vicinity thereof, means for processing the detection event, for determining the charging need of the second power surface and for transferring this information to one or more first induction loops or other arrangements for producing charging current to the second power surface, and means for transferring power from the first power surface to the second power surface. The second power surface may comprise an identification element or elements for detecting a terminal device on the power surface or in the vicinity thereof, for processing this detection event, for determining the charging need of the terminal device and for communicating this information to one or more second induction loops or other arrangements, and one or more induction loops or other arrangements for producing charging current for the terminal device. The terminal device adapted to the system may comprise one or more identification elements, induction loops or other arrangements and an element, such as an accumulator or battery, receiving and storing electrical energy.

The invention and the preferred embodiments thereof allow commonly used everyday surfaces and furnishing elements, for example, to be renewed. This may be achieved for example by incorporating wireless charging systems into everyday furnishing elements without determining, however, other uses of the product. It is also possible to add systems later to already manufactured products. For example, a manufacturer of a table may implement solutions of the invention or a preferred embodiment thereof into a table or in the vicinity thereof either during the manufacturing phase of the table or when the table has been finished. The surface of furnishing elements may be provided with transmitters based on electromagnetic induction, for example, that transmit electric power to electrical devices in their vicinity. The furnishing element may communicate with the devices to be recharged over the commonly known RFID technology, for example, which allows the charger to transmit power only a in situation, where an electrical device or a device having a specific identifier or priority, for example, and requiring current is in the vicinity of the invention. Alternatively, the need for current may be determined automatically by connecting charging current to the primary coil, in which case a change in the current allows to deduce whether there is a device needing current in the vicinity.

According to the above, the surfaces may also be used for another purpose different from their ordinary purpose of use. Hence a floor, for example, which is usually to be walked on, may be used for charging a table. The table, which is primarily used e.g. in mealtimes, for furnishing, as a piece of furniture, as an item of interior decoration may be used for charging a terminal device. In other words, an ordinary piece of furniture, furnishing element or surface may also be used for a new purpose.

According to a preferred embodiment the charging furnishing element may comprise e.g. a surface or recess of a planar or some other shape, primary coils installed underneath or onto the surface, a power source, an RFID receiver, control electronics, a coupling to an electrical network or a connection to another wireless charging system.

According to the invention and the preferred embodiments thereof also constructional surfaces, materials and surface materials may be renewed. This may be carried out by manufacturing constructional floor surface material according to the invention and the preferred embodiments thereof, the material forming a uniform power transfer device needed in wireless charging. In that case all electric current may be hidden in the environment, and wires are no longer visible to the user at all.

In addition, the invention and its preferred embodiments allow electrical devices to be adjusted to a change in the charging event. This may be implemented in various ways. Examples of this include an adapter or a modified outer cover, which include the technology required for wireless reception of power and thereby allow current electrical devices to be used together with a wireless charging system. It is also possible to use a battery in which the battery of an electronic appliance is modified to be suitable for a wireless charging system. The adaptation may also be carried through a USB port or through the port or interface of another terminal device, for example.

The elements needed for changing the charging event may be placed either indoors or outdoors or for example inside a vehicle, such as a ship, car, airplane, train or rocket, or integrated into the structure thereof. One or more elements may be arranged outside the structure, inside the structure or integrated therein. From the user's point of view the charging takes place simply by placing the product, such as a mobile phone, computer, camera, mp3 player, torch or weapon to the vicinity of an ordinary, commonly used furnishing element, whereby the battery becomes automatically charged to its full extent. The furnishing element is water-proof to the extent allowed by the materials of the elements. A charging floor may be placed into any indoor or outdoor premises or for example within a car, ship, train or airplane.

The invention and the preferred embodiments thereof may operate partly or completely automatically. The furnishing element consumes energy only as much as needed, which means that energy consumption is efficient and independent of the user. Chargers meant for charging prior art network equipment consume a lot of energy when attached to the mains current but detached from the device. The device is also capable of switching off itself automatically.

A further advantage of the invention and the preferred embodiments thereof is that all phases of the charging event may be incorporated into other objects also in ordinary use, and according to a preferred embodiment, access thereto is not restricted to products meant for charging alone, although they may contain also these products. A fully wireless and fully automated system of charging electrical devices on the basis of electromagnetic induction or the like may be implemented as described above. The system renders wireless charging of electrical devices independent of the location of plugs in the space concerned.

According to the invention and its embodiments, there is implemented a comprehensive wireless power transfer and a furnishing element based on electromagnetic induction or other arrangement that enables a completely wireless charging system. According to a preferred embodiment the transmitter element enabling the wireless charging and the identifying element are both wireless, the new constructional solutions enabling fully wireless charging.

Portable electrical devices may be recharged on top of a charging furnishing element and/or in the vicinity thereof, thus enabling completely wireless charging. Power transfer may be implemented in real time without storing electricity to the charging furnishing element, or the charging furnishing element may be provided with electricity-storing elements, such as batteries or capacitors, which allows for a more level power transfer between the floor and the furnishing element.

Furniture enabling induction charging is simple and easy to manufacture, and the building of the infrastructure is rapid. The intelligent constructional component described above enables the induction charging property to be conveniently incorporated into conventional mass production furniture, for example, and individual pieces of furniture, in which the property is simple to implement without any special knowledge on the details of wireless charging.

A person skilled in the art will find it obvious that as technology advances the basic idea of the invention may be implemented in various ways. The invention and its embodiments are therefore not restricted to the above examples but may vary within the scope of the claims.

The invention claimed is:
1. An energy transfer arrangement comprising
   a first energy surface;
   first means configured to transfer energy from the first energy surface to a terminal device
   a second energy surface; and
   second means configured to transfer energy from the second energy surface to the first energy surface.
2. An energy transfer arrangement according to claim 1, wherein the first energy surface may be freely placed in relation to the second energy surface.
3. An energy transfer arrangement according to claim 1, wherein at least one of the first and the second means comprise at least one of the following:
   at least one induction loop for wireless power transmission;
   radiowave means;
   microwave means; and laser beam means.
4. An energy transfer arrangement according to claim 1, wherein the second means further comprise means configured to identify the first energy surface, the first means or the terminal device.
5. An energy transfer arrangement according to claim 1, wherein the first means further comprises means configured to identify the second energy surface, the second means or the terminal device.
6. An energy transfer arrangement according to claim 1, wherein the second energy surface comprises at least some of the second means and that the first energy surface comprises at least some of the first means.
7. An energy transfer arrangement according to claim 1, wherein at least one of the second and the first energy surface further comprises:
   at least one of the following: at least one second identifying elements for detecting the first energy surface on the second energy surface or in the vicinity thereof and at least one first identifying elements for detecting the terminal device on the first energy surface or in the vicinity thereof;
   at least one of the following: means configured to process the detected event so as to determine the charging need of the first energy surface and the terminal device and for communicating this information to at least one first means and to the second means.
8. An energy transfer arrangement according to claim 1, wherein an energy-storing element is arranged in connection with at least one of the following: the first energy surface and the second energy surface.
9. An energy transfer arrangement according to claim 1, wherein at least one of the following: at least one identifying elements and the second identifying element are at least one of the following: RFID elements and RF frequency elements and microwave frequency elements.
10. An energy receiver comprising a receiver to receive energy from an energy transfer arrangement comprising:
    a first energy surface;
    first means configured to transfer energy from the first energy surface to a terminal device
    a second energy surface; and
    second means configured to transfer energy from the second energy surface to the first energy surface.
11. An energy receiver according to claim 10, wherein the first energy surface may be freely placed in relation to the second energy surface.
12. An energy receiver according to claim 10, wherein at least one of the first and the second means comprise at least one of the following: at least one induction loop for wireless power transmission;
    radiowave means;
    microwave means; and
    laser beam means.
13. An energy receiver according to claim 10, wherein the second means further comprises means configured to identify the first energy surface, the first means or the terminal device.
14. An energy receiver according to claim 10, wherein the first means further comprises means configured to identify the second energy surface, the second means or the terminal device.
15. An energy receiver according to claim 10, wherein the second energy surface comprises at least some of the second means and that the first energy surface comprises at least some of the first means.
16. An energy receiver according to claim 10, wherein it comprises at least one of the following: an energy-receiving adapter and an energy-receiving battery and an energy-receiving charging cover and an energy-receiving USB port.
17. A method for transferring energy, comprising:
    transferring energy from a first energy surface to a terminal device, wherein the method further comprises:
    transferring energy from a second energy surface to the first energy surface.
18. A method according to claim 17, wherein the method further comprises:
    detecting the first energy surface on the second energy surface or in the vicinity thereof;
    determining the charging need of the first energy surface;
    communicating information on the charging need to at least one second energy means of the second energy surface configured to produce energy for the first energy surface;

detecting the terminal device on the first energy surface or in the vicinity thereof;

determining the charging need of the terminal device; and communicating the information on the charging need to the at least one first energy means of the first energy surface configured to provide the terminal device with energy.

19. An energy transfer arrangement comprising a first energy surface and at least one first transmitting coil-receiving coil system to transfer electric energy from the first energy surface to a mobile terminal device, wherein the arrangement further comprises:

a second energy surface; and at least one second transmitting coil-receiving coil system to transfer electric energy from the second energy surface to the first energy surface.

* * * * *